United States Patent
Freedman et al.

[15] 3,680,915
[45] Aug. 1, 1972

[54] AUTOMOBILE SEAT WITH ADJUSTABLE HEAD-REST

[72] Inventors: Paul Freedman; Gerald Freedman; Robert A. Wahls; Harvey R. Hornstein, all of Evanston, Ill.

[73] Assignee: Freedman Seating Company, Evanston, Ill.

[22] Filed: May 18, 1970

[21] Appl. No.: 38,139

[52] U.S. Cl. ................................................ 297/410
[51] Int. Cl. ............................................. A44b 11/00
[58] Field of Search......297/410, 396, 397, 391, 400; 248/408; 287/58

[56] References Cited

UNITED STATES PATENTS

| | | |
|---|---|---|
| 3,027,194 | 3/1962 | Rumptz ........................ 297/410 |
| 3,477,761 | 11/1969 | Krantz .......................... 297/410 |
| 2,831,530 | 4/1958 | Chiopelas et al. ............. 297/397 |
| 2,557,892 | 6/1951 | Rowan .......................... 287/58 |
| 18,122 | 9/1857 | McCauley ..................... 297/410 |
| 3,063,751 | 11/1962 | Hatch ........................... 297/410 |
| 3,253,859 | 5/1966 | Merriman et al. ............. 297/397 |

Primary Examiner—Bobby R. Gay
Assistant Examiner—Garry Moore
Attorney—Alter, Weiss & Whitesel

[57] ABSTRACT

A head rest is mounted on the upper end of a telescoping member. One element of this member is welded to a seat back frame in a strong, ladder-like construction. The close fit between the telescoping members provide a stability which enables the use of a simple spring biased detent as an indexing mechanism.

5 Claims, 6 Drawing Figures

INVENTORS
PAUL FREEDMAN
GERALD FREEDMAN
ROBERT A. WAHLS
HARVEY R. HORNSTEIN

BY Alter, Weiss and Whitesel
ATTORNEYS

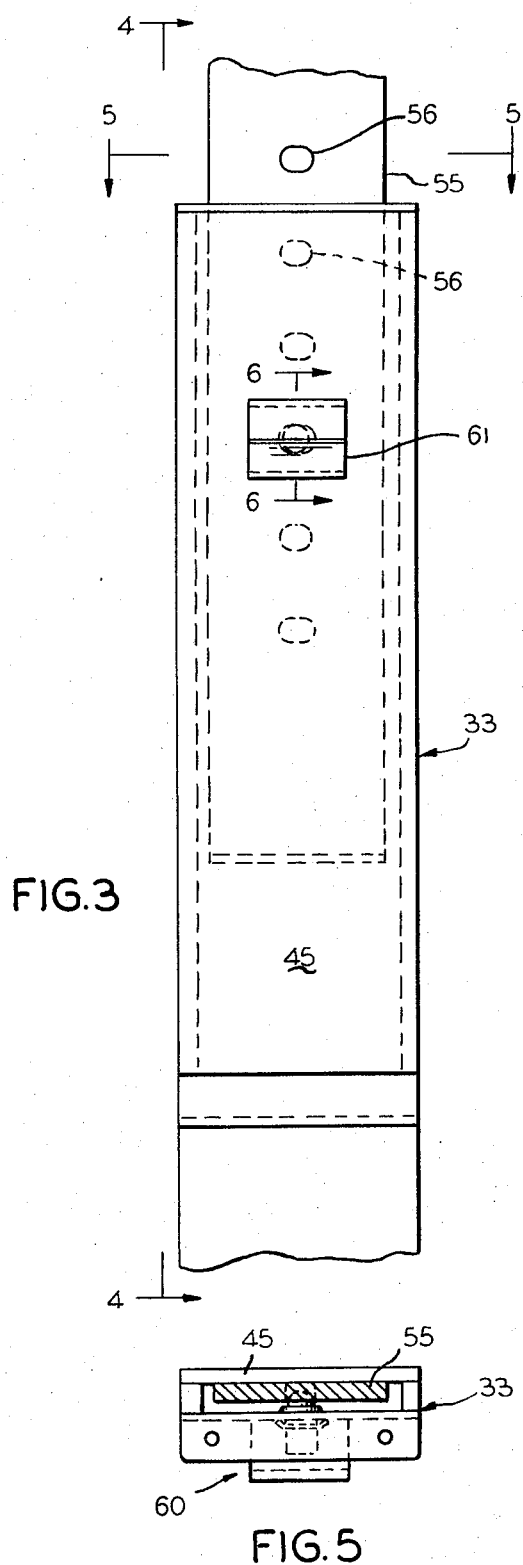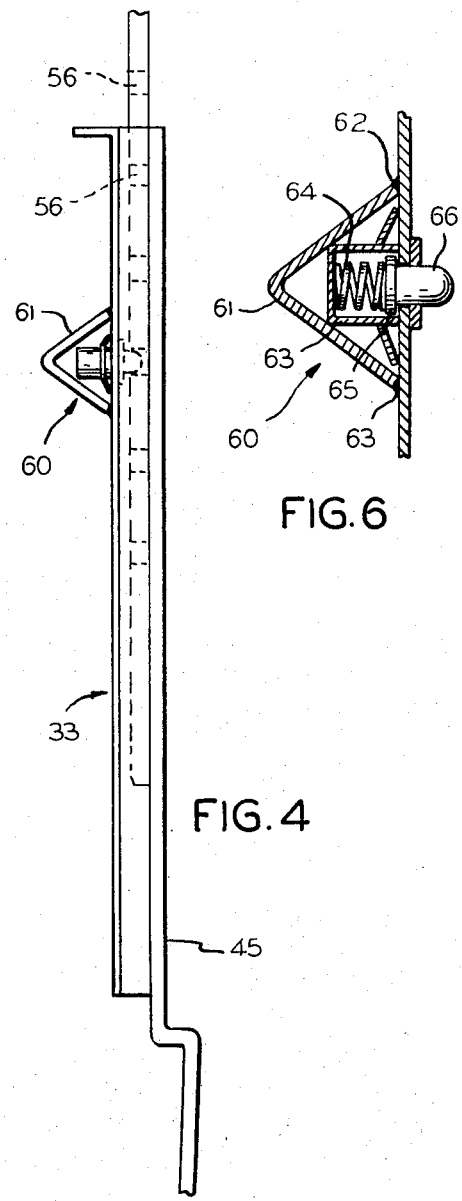

3,680,915

AUTOMOBILE SEAT WITH ADJUSTABLE HEAD-REST

This invention relates to adjustable head-rests especially — although not exclusively — for automobile and truck seats, and more particularly, it relates to head-rests which may be adjusted upwardly or downwardly without requiring any manipulation of latches, catches, push buttons, or the like.

Head-rests on automobile and truck seats should be positioned at any one of many different heights, depending upon the stature of the person sitting in the seat. Some of the factors to consider when designing such and adjustable head-rest relate to the comfort and convenience of the user. It should be easy to adjust the head-rest position while driving. Other factors relate to the safety of having a soft pad at the proper position which minimizes head injuries during periods of sudden deceleration. Among other things, this safety requires the head-rest to remain stable in its adjusted position even when there is a collision with unpredictable angles of impact. The head pad should not retract under impact, and the anchorage should not come loose from the seat frame.

The head-rest and its supporting mechanism should be a low cost structure, easy to make and simple to install, free of complex anchorage adaptors. Also, as many parts as possible shall be commercially available at the low costs which grow out of mass production. Only easily available skills should be required to make, service, and maintain the head-rests.

Accordingly, an object of the invention is to provide new and improved adjustable head-rests. Here, an object is to provide a head-rest which may be adjusted with one hand while the person making the adjustment is driving. In this connection, the head-rest should remain in the adjusted position even when an automobile or truck carrying the seat is involved in a serious accident.

Another object of the invention is to provide greater safety in automobile construction through the use of extremely stable head-rest anchorage.

In keeping with an aspect of the invention, these and other objects are accomplished by a seat back having a ladder-like construction. One of the ladder elements is a long tubular member having a head-rest shaft telescopingly slidable therein. The shaft has a number of detent receiving openings therein for indexing the extended position. A detent in the tube cooperates with these openings to hold the head-rest in its adjusted position. The relatively close and precise fit of the telescoping members and the relatively long overlap section of tube and shaft give a stability and dependability heretofore available only when manually controlled latches, push buttons and the like were used.

The nature of a preferred embodiment of the invention may be understood best from the following description of the invention when taken with the attached drawing, in which:

FIG. 3 is a schematic view of a telescoping member for holding the head-rest;

FIG. 4 is a schematic view which shows the side of the telescoping members, taken along line 4—4 of FIG. 3;

FIG. 5 is a cross sectional view of the telescoping member, taken along line 5—5 of FIG. 3; and FIG. 6 is a cross sectional view of a detent taken along line 6—6 of FIG. 3.

Figure 1:
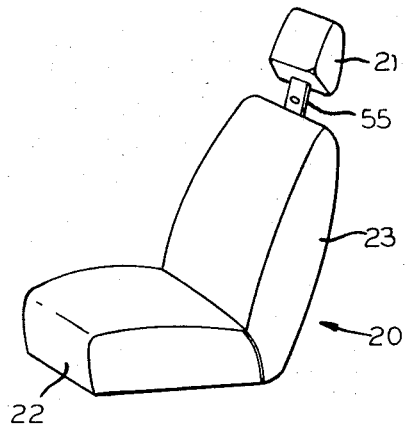
FIG. 1 is a perspective view of an automobile seat and head-rest.

FIG. 1 shows a seat 20 having a head-rest 21 which may be raised or lowered to accommodate the height and comfort of the user. While the seat 20 may have different purposes and uses, it is here shown as an auto seat having a seat 22 and a back 23 with the head-rest slidably attached to the back. The seat and back cushions 22, 23 may have molded polyurethane filler supported on no-sag springs attached to a tubular frame. These cushions may be covered by a vinyl coating with heat sealed panels.

Figure 2:
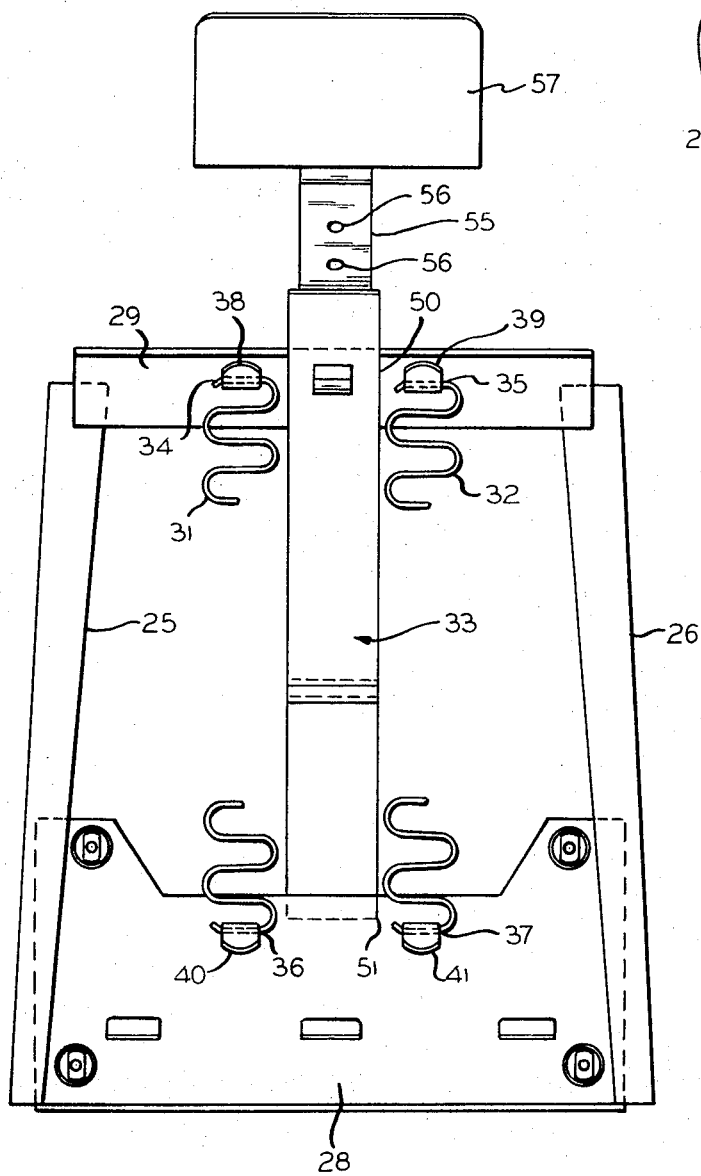
FIG. 2 is an elevation view of the metal frame for a seat back with the padding removed.

By way of example, FIG. 2 shows a ladder-like construction of the frame for the back of the seat. The frame comprises two side rails 25, 26 welded to opposite ends of a horizontal plate 28 near the bottom of the back panel frame. The upper ends of the side rails 25 are joined by a horizontal plate 29. Two exemplary no-sag springs 31, 32 are vertically disposed on opposite sides of a telescoping center support unit 33 with upper and lower ends 34, 35 and 36, 37 hooked over tabs 38, 39 and 40, 41 on the upper and lower horizontal plate supports 29 and 28, respectively.

The center support unit 33 has a first member 45 with a generally tubular shape and a rectangular cross section, as best seen in FIG. 5. This tubular member 45 is welded at 50, 51 to the horizontal support plates 29, 28. This ladder-like frame structure comprising a tubular support welded to a frame which makes a very strong and rigid structure, well braced to protect the person using the seat.

Telescopingly slidable inside the rectangular tube 45 is a shaft 55 for supporting the head-rest 21. A number of detent receiving openings, slots, or holes 56 pierce the head-rest shaft at regular intervals, such as one slot or hole at every 1 inch along the length thereof, for example. A rectangular flat plate 57 is welded to the top of the shaft 55 for supporting the pad of the head-rest. This pad may be polyurethane covered by vinyl.

Upon reflection, it should be apparent that the head-rest support is very strong. The careful fit between the tube 45 and shaft 55 gives great stability. If there should be an accident and a person's head is slammed back against the head-rest, it is extremely unlikely that the unit 33 comprising the tubular and shaft members 45, 55 would be broken loose. Thus, with adequate padding, the head is very well protected in even a severe collision.

The head-rest may be raised or lowered simply by raising or lowering the head-rest. There is no need to manually operate latches, handles, or push buttons in order to release or index the head-rest shaft. More particularly, the index and latching mechanism 60 comprises a protective cover 61 located near the top of said tubular member. This cover may be a simple piece of angle iron welded at 62, 63 over a spring biased detent. Under the cover 61 is a cap-like arrangement 63 having a coil spring 64 therein. The coil spring is compressed between the top of the cap 63 and a flared end 65 on a ball-like detent 66. The exposed end of the detent 60 is shaped with a rounded and cam-like surface which guides the detent up and over the edge of the slots or holes 56. Hence, as the head-rest is lifted or pushed down, the detent 66 moves into and out of the holes 56 stopping in the holes to index the vertical head-rest position.

The long, overlapped, close fitting telescoped portion of the tubular part 45 and the head-rest 55 provides a stability which enables the head-rest to be locked at least as securely — and probably more securely — than other known head-rest supports with manual latches that require manipulation in order to index or release the vertical position.

Other modifications will occur to those who are skilled in the art. Therefore, the appended claims are to be construed to cover all equivalents falling within the scope and spirit of the invention.

What we claim is:

1. A headrest support comprising two massive rigid vertical side rails welded at top and bottom to upper and lower horizontal support plates, a rigid vertical elongated tubular member centrally positioned on said ladder frame and rigidly attached thereto by welding the top and bottom of said tubular member to said horizontal plates, and a shaft telescopingly fitting inside said tubular member with a relatively close fit, said shaft having a number of detent openings therein, said tubular member having an elongated spring bias detent mounted on the outside rear surface of said member for cooperating with said openings to vertically index the headrest, said shaft and tubular members having a substantial overlap length whereby said overlap length is adequate to give a continuously rigid headrest position when said headrest is elevated to a position of maximum displacement.

2. The support of claim 1, wherein said tubular member has a rectangular cross section, the elongated axis of said detent including a coil spring mounted perpendicularly to said tubular member on the outside surface thereof, and said detent extending through a wall of said tubular member.

3. The support of claim 2 and a flat rectangular plate rigidly attached to the upper end of said shaft, and a polyurethane pad covering said flat plate.

4. The support of claim 1, wherein said detent comprises a protective cover welded on the outside of said tubular member, a cap-like arrangement under said cover, a ball-like detent in said cap, and said elongated coiled spring comprising spring bias means compressed between the inside top of said cap and said ball detent.

5. The support of claim 4, wherein said detent is located near the top of said tubular member.

* * * * *